United States Patent [19]

Magro

[11] 4,167,887

[45] Sep. 18, 1979

[54] CONTROL MECHANISM FOR DROPPABLE LOAD

[75] Inventor: Jacques Magro, La Teste, France

[73] Assignee: Matra, Paris, France

[21] Appl. No.: 837,019

[22] Filed: Sep. 27, 1977

[30] Foreign Application Priority Data

Sep. 29, 1976 [FR] France .................................. 76 29273

[51] Int. Cl.² .............................................. F41F 5/02
[52] U.S. Cl. ................................ 89/1.5 D; 244/137 R
[58] Field of Search ............... 89/1.5 D, 1.5 R; 102/2; 244/137 R, 147; 258/1.2

[56] References Cited

U.S. PATENT DOCUMENTS

| | | | |
|---|---|---|---|
| 2,120,477 | 6/1938 | Adams | 244/147 X |
| 3,366,008 | 1/1968 | Grandy | 89/1.5 D |
| 3,575,084 | 4/1971 | Glendenning et al. | 102/2 X |
| 3,713,387 | 1/1973 | Karp | 244/147 X |

*Primary Examiner*—David H. Brown
*Attorney, Agent, or Firm*—Larson, Taylor and Hinds

[57] ABSTRACT

A mechanical pull type control mechanism for a load launched or dropped from an aircraft comprises a flexible cord, one end of which is secured to the aircraft via a pull-away connection and the other end of which is connected to the load. A sheath secured to the load has a plurality of channels slidably locating consecutive loops of the flexible cord and of such size as to frictionally retain them.

8 Claims, 4 Drawing Figures

CONTROL MECHANISM FOR DROPPABLE LOAD

BACKGROUND AND SUMMARY OF THE INVENTION

The invention relates to a mechanical pull type control mechanism for a load to be jettisoned or dropped from a vehicle, inter alia an aircraft, comprising a flexible cord or lanyard, one end of which is adapted to be connected to the vehicle via a pull-away connection and the other end of which is connected to the load.

Mechanisms of this kind are widely used in civil and military aviation, for instance, to pull out a parachute, light a jet motor or thruster, launch a rotating generator which will subsequently be wind-driven or activate a firing fuse. The mechanism must activate the load only when the same has moved far enough away from the vehicle to meet a safety or guard condition or to remove any risk of aerodynamic interaction between the carrying vehicle and the load it has jettisoned.

It is an object of the invention to provide an improved control mechanism, which is simple and economical in construction, reliable in operation and readily adaptable to a very wide variety of loads.

According to an aspect of the invention, there is provided a mechanical pull type control mechanism for a load jettisonable from a vehicle comprising a flexible cord, one end of which is constructed to be secured to the vehicle via a pull-away connection and the other end of which is constructed to be connected to the load, and a sheath constructed to be secured to the load and having a number of channels slidably locating consecutive loops of the flexible cord.

According to a particular embodiment of the invention, the sheath (which can be flexible or rigid) is carried on a support, such as a strap or sleeve, adapted to be secured to the load, for instance by encircling it in the most appropriate position. The sheath, particularly if rigid, can as well be secured to the load directly, e.g. by means of screws screwed into threaded holes. A number of such holes can be distributed along the load to give a choice of places where the sheath can be secured. The resulting flexibility in use is far better than can be provided by a control mechanism which is integral with the load and therefore in a fixed position which cannot be altered.

SHORT DESCRIPTION OF THE DRAWINGS

The invention will be better understood from the following description of an exemplary and non-limitative embodiment of the invention, reference being made to the accompanying drawings wherein.

DETAILED DESCRIPTION OF A PREFERRED EMBODIMENT

Figure 1:
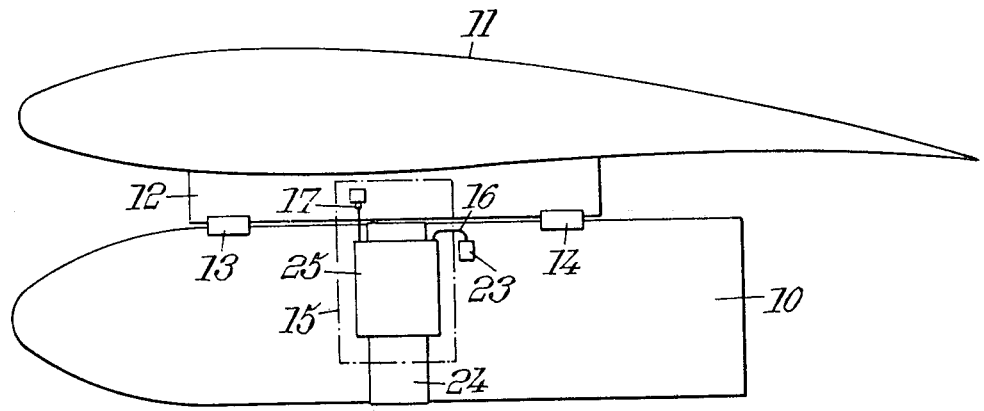
FIG. 1 is a schematic diagram showing a load fitted to a pylon below an aircraft wing and having a control mechanism.

Referring to FIG. 1, there is shown a load 10 located below an aircraft wing 11 and secured to a pylon by two locks or the like 13, 14 adapted to be released in flight. These elements can be of any conventional kind and will therefore not be described. The load can be a civil or military load having a parachute which must be opened after the load has been jettisoned and is some metres away from the aircraft. The load can be a device having propulsive units to be activated in the same conditions or a bomb to be armed or a load comprising a generator which must be started before the load is moving fast enough for the wind to drive a propeller coupled with the generator fast enough.

The load is provided with a mechanism 15 which is adapted to come into operation when the distance between the load and the aircraft reaches a predetermined value and to perform one of the functions hereinbefore outlined or, more generally, any control function. The mechanism 15 comprises a conventional flexible cord or rope 16 of appropriate length—from a few decimeters up to a few meters—which is usually a cord, lanyard or tape of textile, metal or the like. Typically, a polyamide or polyester cable a few millimeters in diameter is used.

Figure 2:
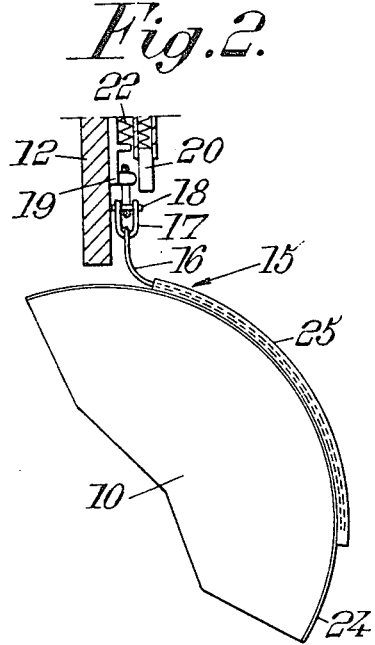
FIG. 2 is a diagrammatic view of the control mechanism in section in a plane transverse to the plane of FIG. 1.

One of the end portions of the cord 16 has attachment means for securing it to the aircraft in such a way that the cord is released when a pull force is exerted on it and exceeds a predetermined value F which is typically about 40 kg. The connection can be of any type suitable for the required function, for instance as shown in FIG. 2. The end portion of the cord is provided with a shackle 17 closed by a pin or the like 18 adapted to rupture when subjected to a pull exceeding force F. The pin 18 projects across a ring 21. In connected condition, ring 21 is retained on a finger 19 by a resiliently returned bolt or the like 20. During normal operation, the finger 19 is positively locked in position by the bolt. Means are usually provided for the pilot to release the finger 19 and therefore refraining from operating the mechanism 15 when dropping the load, e.g. for emergency jettisoning. When unlocked, the finger 19 is retained only by a spring 22 which yields at a pull F' which is less than F and which is e.g. 10 kg if F is 40 kg.

The other end of cord 16 is provided with attachment means for connection to an element 23 of the load. After control of the load has been achieved, the load applies a tractive force greater than F to the cord to pull the same away from the aircraft.

When the mechanism is operative and before the load is dropped, the cord 16 is coiled in a sheath 25 carried by the load. The sheath 25 can be flexible or rigid. It need not be an integral part of the load. It can be disposed thereon at the most appropriate place; for instance, and more particularly in the usual case of substantially cylindrical loads of relatively small diameter, e.g. 200 mm, the sheath 25 can be carried by a textile, or plastics or metal strap or collar 24 encircling the load.

That arrangement is particularly suitable in the case of a flexible sheath which can be fitted to loads of different shapes and in particular in different diameters. A rigid sheath, however, can be secured to the load directly, e.g. by screws. A number of threaded holes for receiving the sheath fixing screws can be provided in the load, only some of them being used for locating the sheath at a particular location, whereby it is possible to secure the sheath to different parts of the load.

For preventing accidental pay-out of cord 16, it is usually connected to the sheath at a place somewhere between the first loop 26 of the cord from the aircraft and the cord end secured to the aircraft. The resulting connection must of course yield at a force less than F (but greater than F' if there is provision for emergency jettisoning without triggering). The connection 27 can take the form of a simple textile yarn ligature or stitch which catches a knot of the cord 16.

There should be no piece of loose cord between the last loop 28 and the cord end secured to the load. To take up slack, the last loop of the cord can be provided with a pull wire 29 which, once the sheath has been positioned and both ends of the cord have been connected, is pulled to take up the slack in the last channel of the sheath 25.

A wide variety of sheaths can be used. If it is required to be secured to a load of well determined shape, the sheath can be rigid. In most cases however, the sheath is conveniently made of a flexible material so as to be adaptable to loads of different sizes and shapes.

Figure 3:
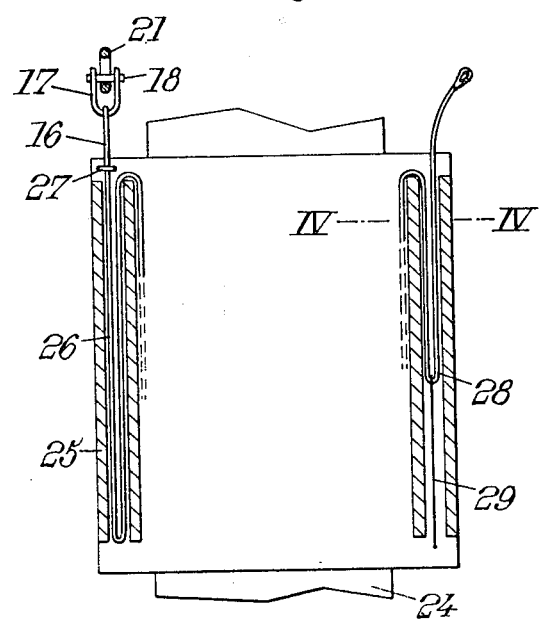
FIG. 3 is a developed view in partial section of the cord-receiving sheath of the mechanism.
Figure 4:
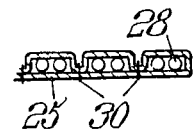
FIG. 4 is a simplified cross-section along line IV of FIG. 3.

In the embodiment shown in FIGS. 3 and 4, the sheath 25 takes the form of a fabric sheath or layer folded back on itself, the two folds being secured to one another along lines 30 to bound the loop-receiving passages. The two folds of the original sheet can be connected along lines by sewing or, if the material is heat-weldable, by welding between two jaws. The channels are typically sized to retain the loops by friction of the cord on the sheath wall and friction between the two "runs" of each loop. As material for the sheath there can be used inter alia a synthetic fabric, e.g. of polyamide or polyester yarns. A sheet of a thermoplastics material can also be used. Moulded plastics or even metal can be used for a rigid sheath.

A sheath whose channels open at both ends can be used; then the separations between successive channels preferably do not extend as far as the lateral edge of the sheath, so that the bends of cord 16 are disposed inside the sheath and are therefore protected against wind effects and the risk of catching in something.

The channels can of course be contrived in any direction so as to be disposed circumferentially or longitudinally relatively to the load. A plurality of layers of channels can be provided. As a rule, the sheath is so sized that the loops are longer than 15 cm, so as not to need an excessive number of channels. When the sheath is to accomodate current loads (of cylindrical shape whose diameter is about 200 mm) recourse is often had to sheaths adapted to receive a loop of from 20 to 30 cm long in each passage. The loops can be longer in the case of sheaths for large-diameter loads.

The mechanism can be assembled by a wide variety of procedures. The simplest procedure is first to make the sheath, then to introduce the consecutive loops thereinto by sliding them in with a needle before sewing at 27 the cord portion projecting toward the aircraft. The sheath can be adapted to receive a securing strap 24. Once the sheath has been secured to the load, its end portions are secured and the wire 29 is manually pulled to take up any slack of the last loop.

Upon normal dropping the ligature 27 is broken upon separation of the load. The pay-out cord 16 uncoils, starting from the first loop (closest to the aircraft). When completely uncoiled, the cord 16 operates the load, for instance by pulling an actuator, or (if an aerodynamic generator is launched) by causing a cord to unwind, or moves some other element. After actuation, the cord is stretched and applies a shearing force to pin 18. The load continues on its path, taking with it the cord 16 which has been separated from the aircraft originally carrying it.

I claim:

1. A mechanical pull type control mechanism for a load launched or dropped from a vehicle, comprising flexible cord means having two end portions, attachment means on a first of said end portions for connection to the vehicle via a pull-away connection, attachment means on the other end portion for connection to the load, and a sheath securable to the load and formed with a plurality of channels adapted to receive and frictionally retain consecutive loops of a length of the flexible cord means between said end portions, said consecutive loops being devoid of positive connection to the sheath.

2. A mechanism according to claim 1, wherein the channels are each sized to receive a loop of at least 15 cm long.

3. A mechanism according to claim 1, wherein the channels have transverse dimensions such that uncoiling of the flexible cord is retarded by friction of the cord on the sheath and on itself.

4. A mechanism according to claim 1, wherein the sheath comprises two layers or folds of flexible fabric stuck or sewn together along lines separating the channels.

5. A mechanism according to claim 4, wherein said lines are parallel to one another.

6. A mechanism according to claim 4, wherein the separations between adjacent channels are short enough for the cord bends to remain inside the sheath between two consecutive loops.

7. A mechanical pull type control mechanism for a load launched or dropped from a vehicle, comprising flexible cord means having two end portions, attachment means on a first of said end portions for connection to the vehicle via a pull-away connection, attachment means on the other end portion for connection to the load, and a sheath securable to the load and formed with a plurality of channels adapted to receive and frictionally retain consecutive loops of a length of the flexible cord means between said end portions, wherein the flexible cord is secured to the sheath between its first end portion and its first loop by a connection dimensioned to rupture under a force less than the force required to separate the first end portion of the cord from the vehicle.

8. A mechanical pull type control mechanism for a load launched or dropped from a vehicle, comprising flexible cord means having two end portions, attachment means on a first of said end portions for connection to the vehicle via a pull-away connection, attachment means on the other end portion for connection to the load, a sheath securable to the load and formed with a plurality of channels adapted to receive and frictionally retain consecutive loops of length of the flexible cord means between said end portions and pull wire means for manually pulling the last loop into a corresponding sheath channel and thus taking up any slack.

* * * * *